US012776201B2

(12) United States Patent
Tani et al.

(10) Patent No.: US 12,776,201 B2
(45) Date of Patent: *Oct. 27, 2026

(54) SYSTEM FOR MONITORING EVENT RELATED DATA

(71) Applicant: NEC Corporation, Tokyo (JP)

(72) Inventors: Masahiro Tani, Singapore (SG); Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/094,729

(22) Filed: Mar. 28, 2025

(65) Prior Publication Data

US 2025/0225862 A1 Jul. 10, 2025

Related U.S. Application Data

(63) Continuation of application No. 19/052,373, filed on Feb. 13, 2025, which is a continuation of application (Continued)

(30) Foreign Application Priority Data

Feb. 17, 2015 (SG) .......................... 10201501222X

(51) Int. Cl.

*G08B 29/18* (2006.01)
*G08B 13/19* (2006.01)

(Continued)

(52) U.S. Cl.

CPC ........... *G08B 29/188* (2013.01); *G08B 13/19* (2013.01); *G08B 13/19697* (2013.01);

(Continued)

(58) Field of Classification Search

CPC ................. G08B 29/188; G08B 13/19; G08B 13/19697; G08B 25/006; G08B 13/19643; G08B 17/125; H04N 7/188

(Continued)

(56) References Cited

U.S. PATENT DOCUMENTS 5,693,943 A 12/1997 Tchernihovski
6,246,321 B1 6/2001 Rechsteiner (Continued)

FOREIGN PATENT DOCUMENTS

CN 104243894 A 12/2014
EP 1480450 A2 11/2004

(Continued)

OTHER PUBLICATIONS

International Search Report for PCT Application No. PCT/JP2016/000783, mailed on May 10, 2016.

(Continued)

*Primary Examiner* — Loi H Tran
(74) *Attorney, Agent, or Firm* — Sughrue Mion, PLLC

(57) ABSTRACT

A system for monitoring event related data including a sensor data analyzer, an event analyzer and an actuator is disclosed. The sensor data analyzer detects events based on sensor data, the event analyzer couples to the sensor data analyzer and estimates the size of the detected entire events based on event related data of the detected events from the sensor data analyzer, and the actuator couples to the sensor data analyzer and the event analyzer and actuates a predetermined device based on the estimated size of the detected entire events.

30 Claims, 10 Drawing Sheets

Related U.S. Application Data

No. 18/134,129, filed on Apr. 13, 2023, now Pat. No. 12,272,230, which is a continuation of application No. 17/135,079, filed on Dec. 28, 2020, now Pat. No. 11,670,159, which is a continuation of application No. 16/354,297, filed on Mar. 15, 2019, now Pat. No. 10,970,995, which is a continuation of application No. 15/546,717, filed as application No. PCT/JP2016/000783 on Feb. 16, 2016, now abandoned.

(51) Int. Cl.
*G08B 13/196* (2006.01)
*G08B 25/00* (2006.01)
*H04N 7/18* (2006.01)
*G08B 17/12* (2006.01)

(52) U.S. Cl.
CPC ........... *G08B 25/006* (2013.01); *H04N 7/188* (2013.01); *G08B 13/19643* (2013.01); *G08B 17/125* (2013.01)

(58) Field of Classification Search
USPC .......................................................... 348/152
See application file for complete search history.

(56) References Cited

U.S. PATENT DOCUMENTS

| | | | | |
|---|---|---|---|---|
| 6,970,183 | B1 * | 11/2005 | Monroe | G08B 7/062 348/E7.086 |
| 7,301,557 | B2 | 11/2007 | Kakou et al. | |
| 7,619,647 | B2 | 11/2009 | Wren et al. | |
| 7,619,660 | B2 | 11/2009 | Grosvenor | |
| 7,952,609 | B2 | 5/2011 | Simerly et al. | |
| 8,260,006 | B1 | 9/2012 | Callari et al. | |
| 8,687,077 | B2 | 4/2014 | Choi et al. | |
| 8,788,218 | B2 | 7/2014 | Soles et al. | |
| 9,781,348 | B1 * | 10/2017 | Bart | H04N 7/183 |
| 10,200,621 | B1 | 2/2019 | Bart | |
| 12,272,230 | B2 | 4/2025 | Tani et al. | |
| 2003/0185419 | A1 * | 10/2003 | Sumitomo | H04N 23/61 382/103 |
| 2005/0100329 | A1 | 5/2005 | Lao et al. | |
| 2006/0056056 | A1 | 3/2006 | Ahiska et al. | |
| 2006/0227237 | A1 | 10/2006 | Kienzle et al. | |
| 2008/0084473 | A1 | 4/2008 | Romanowich | |
| 2009/0028440 | A1 | 1/2009 | Elangovan et al. | |
| 2009/0040302 | A1 | 2/2009 | Thompson | |
| 2009/0086041 | A1 * | 4/2009 | Choi | H04N 23/661 348/E5.042 |
| 2009/0174772 | A1 * | 7/2009 | Tapp | G08B 13/19689 348/143 |
| 2009/0257314 | A1 | 10/2009 | Davis | |
| 2009/0261967 | A1 * | 10/2009 | Chen | G08B 25/006 340/541 |
| 2010/0033318 | A1 * | 2/2010 | Tampke | H04M 11/002 340/531 |
| 2010/0134619 | A1 | 6/2010 | Hampapur et al. | |
| 2010/0245583 | A1 | 9/2010 | Harel | |
| 2011/0013018 | A1 * | 1/2011 | Leblond | G08B 13/19695 348/143 |
| 2011/0235532 | A1 | 9/2011 | Alizadeh-Shabdiz et al. | |
| 2012/0062691 | A1 | 3/2012 | Fowler et al. | |
| 2012/0131985 | A1 | 5/2012 | Brasfield | |
| 2013/0128070 | A1 | 5/2013 | Ishikawa | |
| 2013/0197853 | A1 | 8/2013 | Itani | |
| 2013/0297748 | A1 * | 11/2013 | Wilson | H04L 67/02 709/224 |
| 2013/0338450 | A1 | 12/2013 | Osorio | |
| 2014/0266699 | A1 * | 9/2014 | Poder | H04W 4/029 340/539.13 |
| 2015/0161572 | A1 | 6/2015 | Oh et al. | |
| 2015/0206419 | A1 | 7/2015 | Johnson et al. | |
| 2016/0349352 | A1 | 12/2016 | Karani | |
| 2017/0116434 | A1 * | 4/2017 | Finkel | G06F 21/6218 |
| 2017/0237942 | A1 | 8/2017 | Arikuma et al. | |
| 2017/0251173 | A1 | 8/2017 | Siminoff et al. | |

FOREIGN PATENT DOCUMENTS

| | | | |
|---|---|---|---|
| JP | H05-159179 | A | 6/1993 |
| JP | H07-274150 | A | 10/1995 |
| JP | H10-208175 | A | 8/1998 |
| JP | H10-326385 | A | 12/1998 |
| JP | 2000-083243 | A | 3/2000 |
| JP | 2000-092368 | A | 3/2000 |
| JP | 3157178 | B2 | 4/2001 |
| JP | 2001-245284 | A | 9/2001 |
| JP | 2002-084530 | A | 3/2002 |
| JP | 2002-158801 | A | 5/2002 |
| JP | 2002-367065 | A | 12/2002 |
| JP | 2003-168179 | A | 6/2003 |
| JP | 2003-208682 | A | 7/2003 |
| JP | 2003-247238 | A | 9/2003 |
| JP | 2003-256964 | A | 9/2003 |
| JP | 2004-078393 | A | 3/2004 |
| JP | 2005-130033 | A | 5/2005 |
| JP | 3113937 | U | 9/2005 |
| JP | 2006-509422 | A | 3/2006 |
| JP | 2006-184985 | A | 7/2006 |
| JP | 2006-186739 | A | 7/2006 |
| JP | 2006-332754 | A | 12/2006 |
| JP | 2007-135000 | A | 5/2007 |
| JP | 2008-507229 | A | 3/2008 |
| JP | 2008-097222 | A | 4/2008 |
| JP | 2009-288843 | A | 12/2009 |
| JP | 2009-290501 | A | 12/2009 |
| JP | 2010-187165 | A | 8/2010 |
| JP | 2010-232888 | A | 10/2010 |
| JP | 2011-076316 | A | 4/2011 |
| JP | 2011-217055 | A | 10/2011 |
| JP | 2012-043392 | A | 3/2012 |
| JP | 2012-203595 | A | 10/2012 |
| JP | 2013-196655 | A | 9/2013 |
| JP | 2014-178761 | A | 9/2014 |
| JP | 2014-178884 | A | 9/2014 |
| JP | 2014-215816 | A | 11/2014 |
| JP | 2017-539114 | A | 12/2017 |
| KR | 20-0413332 | Y1 | 4/2006 |
| KR | 10-0872878 | B1 | 12/2008 |
| KR | 10-1149401 | B1 | 6/2012 |
| KR | 2014-0106300 | A | 9/2014 |
| WO | 2010/081806 | A1 | 7/2010 |
| WO | 2011/019101 | A1 | 2/2011 |
| WO | 2013140671 | A1 | 9/2013 |
| WO | 2014/174737 | A1 | 10/2014 |

OTHER PUBLICATIONS

Written opinion for PCT Application No. PCT/JP2016/000783 mailed on May 10, 2016.

Singapore Office Action for SG Application No. 11201706695S dated on Apr. 10, 2018.

US Office Action for U.S. Appl. No. 15/546,717 mailed on May 30, 2019.

US Office Action for U.S. Appl. No. 16/354,323 mailed on Sep. 6, 2019.

Japanese Office Action for JP Application No. 2017-538442 mailed on Oct. 8, 2019 with English Translation.

US Office Action for U.S. Appl. No. 15/546,717 mailed on Nov. 14, 2019.

Japanese Office Action for JP Application No. 2017-538442 mailed on Dec. 24, 2019 with English Translation.

US Office Action for U.S. Appl. No. 15/546,717 mailed on Mar. 5, 2020.

Japanese Office Action for JP Application No. 2017-538442 mailed on Mar. 17, 2020 with English Translation.

US Office Action for U.S. Appl. No. 16/354,323 mailed on Mar. 19, 2020.

US Office Action for U.S. Appl. No. 15/546,717 mailed on Aug. 21, 2020.

(56) References Cited

OTHER PUBLICATIONS

Japanese Office Action for JP Application No. 2020-028048 mailed on Oct. 20, 2020 with English Translation.
Japanese Office Action for JP Application No. 2020-028048 mailed on Mar. 16, 2021 with English Translation.
Japanese Office Action for JP Application No. 2020-028048 mailed on Nov. 9, 2021 with English Translation.
JP Office Action for JP Application No. 2022-104242, mailed on Jul. 4, 2023 with English Translation.
JP Office Action for JP Application No. 2024-001598, mailed on Nov. 26, 2024 with English Translation.
U.S. Appl. No. 19/052,373, filed Feb. 13, 2025.
U.S. Appl. No. 18/134,129, filed Apr. 13, 2023.
U.S. Appl. No. 17/135,079, filed Dec. 28, 2020.
U.S. Appl. No. 16/354,297, filed Mar. 15, 2019.
U.S. Appl. No. 15/546,717, filed Jul. 27, 2017.
Michael Isard et al., "CONDENSATION—Conditional Density Propagation for Visual Tracking", International Journal of Computer Vision, vol. 29, No. 1, 1998.
Zdenek Kalal et al., "Tracking-Learning Detection", IEEE Transactions on Pattern Analysis and Machine Intelligence, vol. 6, No. 1, Jan. 2010,pp. 1-14.
Axis Introduces HDTV Image Quality and Precise Iris Control in New Fixed Day and Night Network Camera Series; Axis P13 Network Cameras Ideal for Securing Government Buildings, Retail Environments, Airports, Public Transportation, Business Wire, May 11, 2009.
US Office Action for U.S. Appl. No. 19/052,373, mailed on Feb. 27, 2026.
Japanese Office Action for JP Application No. 2025-093868, mailed on Aug. 4, 2026 with English Translation.

* cited by examiner

Fig. 8

800

| DESTINATION | SIZE OF EVENT |
|---|---|
| POLICE | SMALL |
| FIRE AND AMBULANCE SERVICE DIVISION | MEDIUM |
| COUNTER TERRORISM ACTION GROUP | LARGE |
| *** | *** |
| *** | *** |
| *** | *** |

SYSTEM FOR MONITORING EVENT RELATED DATA

The present application is a Continuation Application of U.S. application Ser. No. 19/052,373, filed Feb. 13, 2025, which is a Continuation Application of U.S. application Ser. No. 18/134,129 filed on Apr. 13, 2023, which is a Continuation Application of U.S. Ser. No. 17/135,079 filed on Dec. 28, 2020, which issued as U.S. Pat. No. 11,670,159, which is a Continuation Application of U.S. application Ser. No. 16/354,297 filed on Mar. 15, 2019, which issued as U.S. Pat. No. 10,970,995, which is a Continuation Application of U.S. application Ser. No. 15/546,717 filed on Jul. 27, 2017, which is a National Stage Entry of PCT/JP2016/000783 filed on Feb. 16, 2016, which claims priority from Singapore Patent application Ser. No. 10201501222X filed on Feb. 17, 2015, the contents of all of which are incorporated herein by reference, in their entirety.

TECHNICAL FIELD

The invention relates to a surveillance system. More specifically, the invention relates to a system for monitoring event related data.

BACKGROUND ART

Surveillance systems such as video surveillance systems have been used in several areas for routine surveillance and for event detection. Abnormal events such as terrorism, riot, theft, fighting, fire, car accidents, etc. are meant to be captured by such surveillance systems.

However, in some situations, a surveillance camera cannot capture abnormal events within the surveillance area at an appropriate size to adequately cover the abnormal event. Therefore, users, including security officers and police officers, are not able to understand an incident appropriately because a surveillance camera captures only a part of the whole of the event.

Thus, what is needed and an object of the disclosure is to provide an improved surveillance system that captures abnormal events within a surveillance area at a size appropriate to the abnormal event. Furthermore, other desirable features and characteristics will become apparent from the subsequent detailed description and the appended claims, taken in conjunction with the accompanying drawings and this background of the disclosure.

SUMMARY OF INVENTION

In a first aspect of the present invention, a system for monitoring event related data including a sensor data analyzer, an event analyzer and an actuator is disclosed. The sensor data analyzer detects events based on sensor data. The event analyzer is coupled to the sensor data analyzer and estimates the size of the entire detected events based on event related data of the detected events from the sensor data analyzer. The actuator is coupled to the sensor data analyzer and the event analyzer and actuates a predetermined device based on the estimated size of the entire detected events.

In a second aspect of the present invention, a method for monitoring event related data is disclosed. The method includes detecting events based on sensor data; estimating the size of the entire detected events based on event related data of the detected events; and actuating a predetermined device based on the estimated size of the entire detected events.

In addition, the object is also achieved by a computer program that achieves the method for monitoring event related data having the above-described configurations with a computer, and a computer-readable recording medium that stores the computer program.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present embodiment.

FIG. 8 depicts a look-up table for alarm notification system in accordance with the first exemplary embodiment.

Skilled artisans will appreciate that elements in the figures are illustrated for simplicity and clarity and have not necessarily been depicted to scale. For example, the dimensions of some of the elements in the simulation visualization or steps in the flowcharts may be exaggerated in respect to other elements to help improve understanding of the present embodiment.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. It is the intent of the following embodiments to present an improved method for monitoring event related data.

First Exemplary Embodiment

Figure 1:
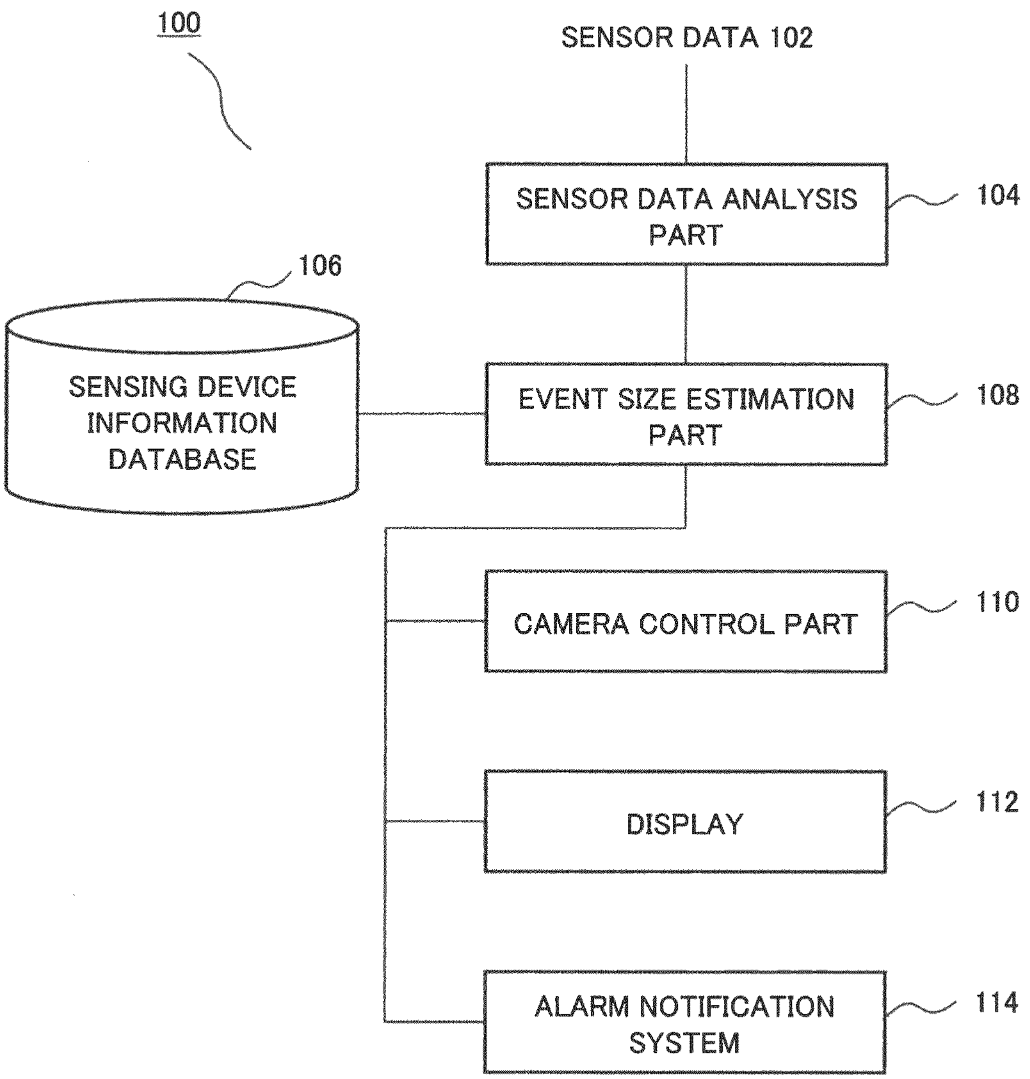
FIG. 1 depicts a block diagram of a video surveillance system in accordance with a first exemplary embodiment.

FIG. 1 depicts a block diagram of a video surveillance system 100 in accordance with a present embodiment. The video surveillance system 100 includes a sensor data analysis part 104, an event size estimation part 108 and a camera control part 110. The sensor data analysis part 104 receives sensor data 102 captured by sensing device(s), and detects an abnormal event with related information, including the detected time, within a surveillance area. The event size estimation part 108 is coupled to the sensor data analysis part 104 and estimates the size of the entire detected event using a time series of the detected event and sensing device information, including the device location stored within a sensing device information database 106. The camera control part 110 controls the surveillance camera (e.g. zooming-in, zooming-out, changing the direction of the camera) based on the estimated size of the entire detected event. Alternatively, a display 112 may show information based on the estimated size of the entire detected event. Also, an alarm notification system 114 may send alarm to a predetermined destination based on the estimated size of the entire detected event. In an example, the system 100 may include one or more of the following predetermined device: a camera control part 110, a display 112 and an alarm notification system 114.

The event size estimation part 108 advantageously estimates the appropriate size of entire detected events. And then, an actuator actuates a predetermined sensing device to facilitate understanding of the situation. In one example, the surveillance camera captures the whole event and facilitates security officers to understand the situation quickly. Alternatively, a display device shows the estimated size of entire detected events on a map to assist security officers to understand the situation quickly. Users may customize the predetermined device to actuate in a predetermined manner in response to detection of predetermined situations.

Also, the size estimation of entire detected events is based on the type of events detected by the sensor data analysis part 104. For example, if the type of detected event is an explosion, the size of the entire detected event is considered large. Thus, an actuator actuates a predetermined device taking into account the large size of the entire detected event. Therefore, users, including security officers and police officers, are able to understand an incident appropriately since a surveillance camera or other devices are adjusted automatically based on the size of the incident (abnormal event) to capture the whole of the event. The present embodiment enables the users to deal with the incident quickly and properly. The users may customize the size of the event corresponding to the type of event. The users are also able to investigate the incident using the appropriate video footage after the incident.

Figure 2:
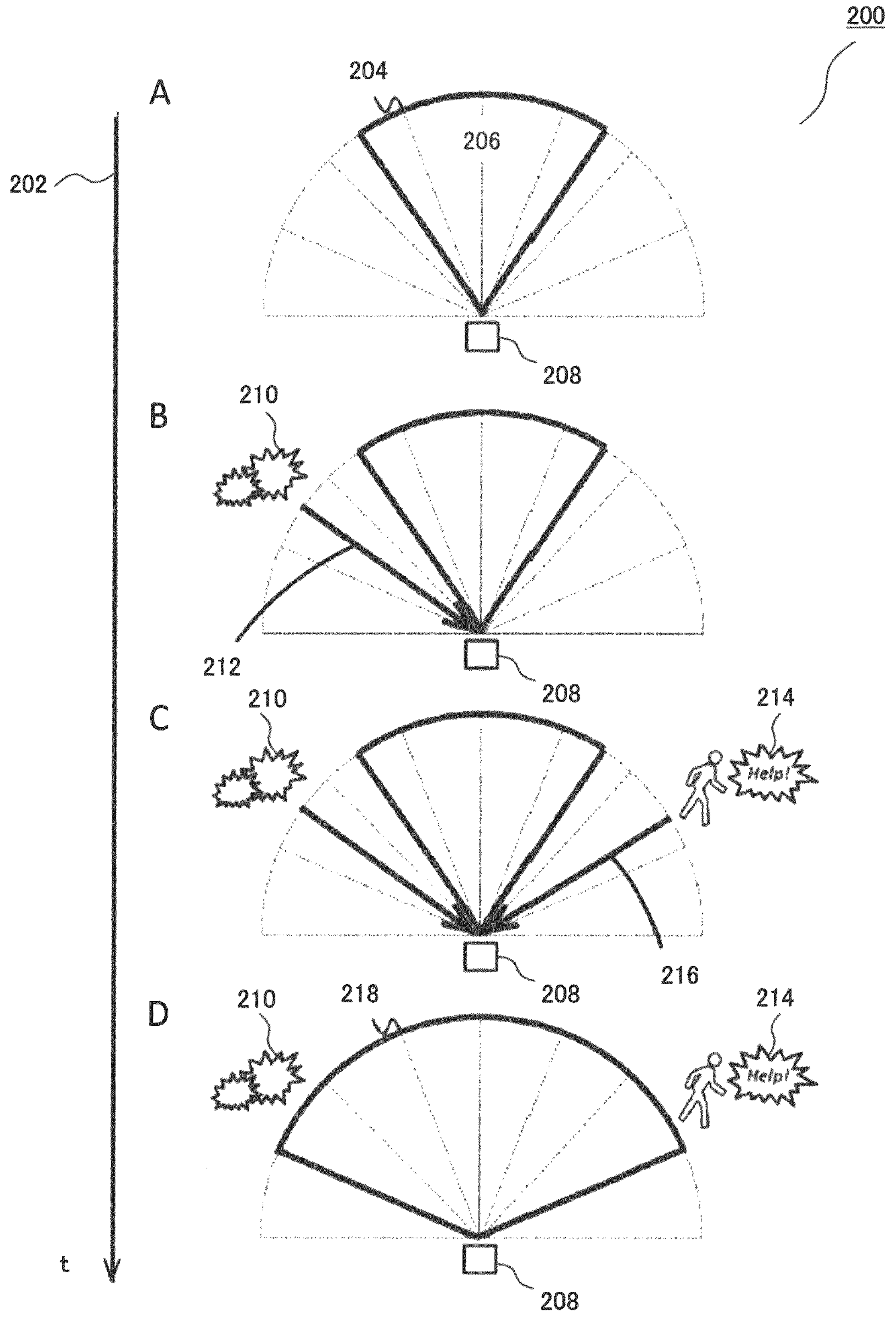
FIG. 2 depicts an example of imaging range adjustment based on sound (zoom-out) in accordance with the first exemplary embodiment.

FIG. 2 depicts an imaging range adjustment based on sound (zoom-out) 200 in accordance with a present embodiment. Timeline 202 shows 4 steps (A to D) for the imaging range adjustment 200. At step A, Field of View 206 of a camera and microphone array 208 is set at an initial imaging range 204. At step B, the camera and microphone array 208 captures sounds of breaking glass 210 from a direction of arrival 212. At step C, the camera and microphone array 208 further captures sounds of shouting 214 from a direction of arrival 216. At step D, the event size estimation part 108 estimates the size of the event by calculating both right and left maximum angles for Field of View within the direction of the camera in the camera and microphone array 208 and within a predetermined time width. Then, the camera control part 110 controls the camera in the camera and microphone array 208 by comparing the current setting of the camera with the estimated size of the event consisting of the maximum angles and Field of View 206 of the camera and microphone array 208 to cause the camera and microphone array 208 to zoom-out to adjusted imaging range 218.

Figure 3:
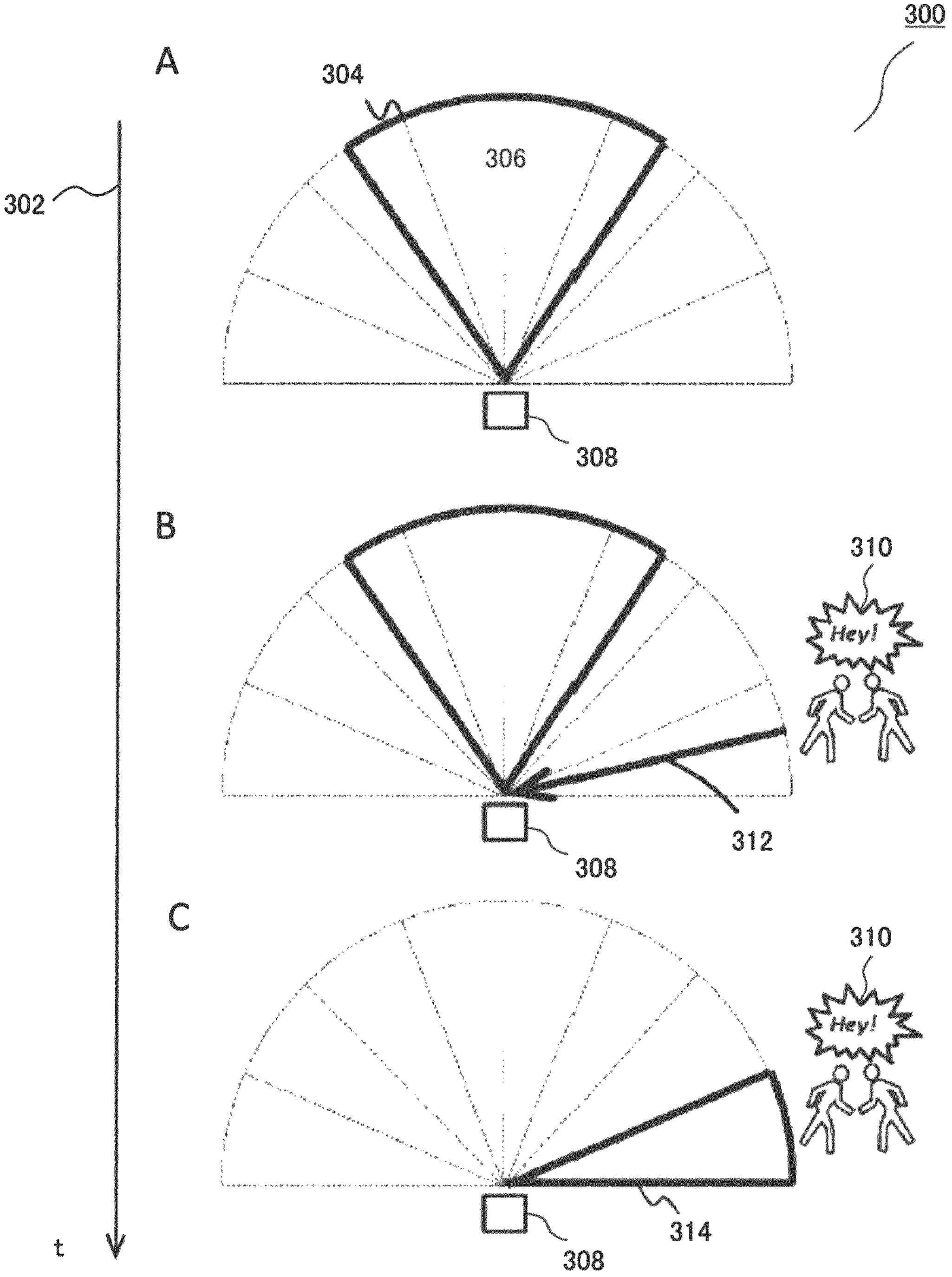
FIG. 3 illustrates an example of imaging range adjustment based on sound (zoom-in and controlling the direction of the camera) in accordance with the first exemplary embodiment.

FIG. 3 depicts an imaging range adjustment based on sound (zoom-in and controlling the direction of the camera) 300. Timeline 302 shows three steps (A to C) for the imaging range adjustment 300. At step A, a Field of View 306 of a camera and microphone array 308 is set at an initial adjustment range 304. At step B, the camera and microphone array 308 captures sounds of fighting 310 from a direction of arrival 312. At step C, the event size estimation part 108 estimates the size of the event by calculating both right and left maximum angles for Field of View within the direction of the camera and microphone array 308 and within a predetermined time width. Then, the camera control part 110 controls the camera and microphone array 308 by comparing the current setting of the camera with the estimated size of the event consisting of the maximum angles to cause the camera and microphone array 308 to control the direction and Field of View of the camera to rotate and zoom-in to an adjusted imaging range 314.

Figure 4:
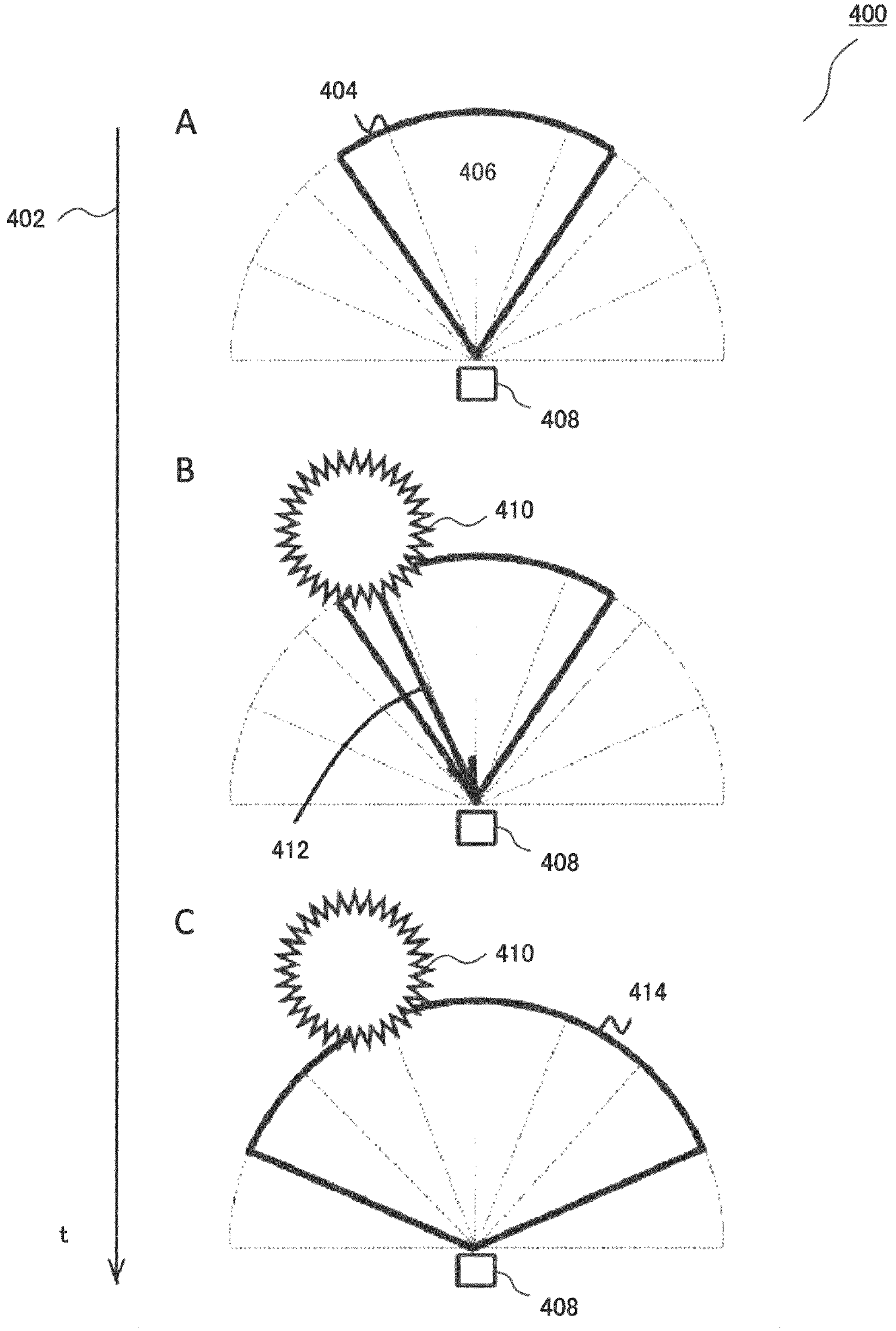
FIG. 4 depicts an example of imaging range adjustment based on the type of sound event (zooming-out) in accordance with the first exemplary embodiment.

FIG. 4 depicts an imaging range adjustment based on the type of sound event (zoom-out) 400. Timeline 402 shows three steps (A to C) for the imaging range adjustment 400. At step A, a Field of View 406 of a camera and microphone array 408 is set at an initial adjustment range 404. At step B, the camera and microphone array 408 captures a sound of an explosion 410 from a direction of arrival 412. At step C, the event size estimation part 108 estimates the size of the event by the type of event (e.g. when the sensor data analysis part 104 detects a large-scale event like the explosion 410, the event size estimation part 108 decides the size of the event is “Large”). Then, the camera control part 110 controls the camera of the camera and microphone array 408 in response to the received size of the event. When the size is “Large”, the camera control part 110 zooms out the camera to a predetermined setting (the widest setting). Then, the camera control part 110 controls the direction and Field of View of camera to zoom-out to adjusted imaging range 414. When the sensor data analysis part 104 detects a small-scale event like the theft, the event size estimation part 108 can decide the size of the event is “Small”. Also, when the sensor data analysis part 104 detects a medium-scale event like the fire, the event size estimation part 108 can decide the size of the event is “Medium”.

Figure 5:
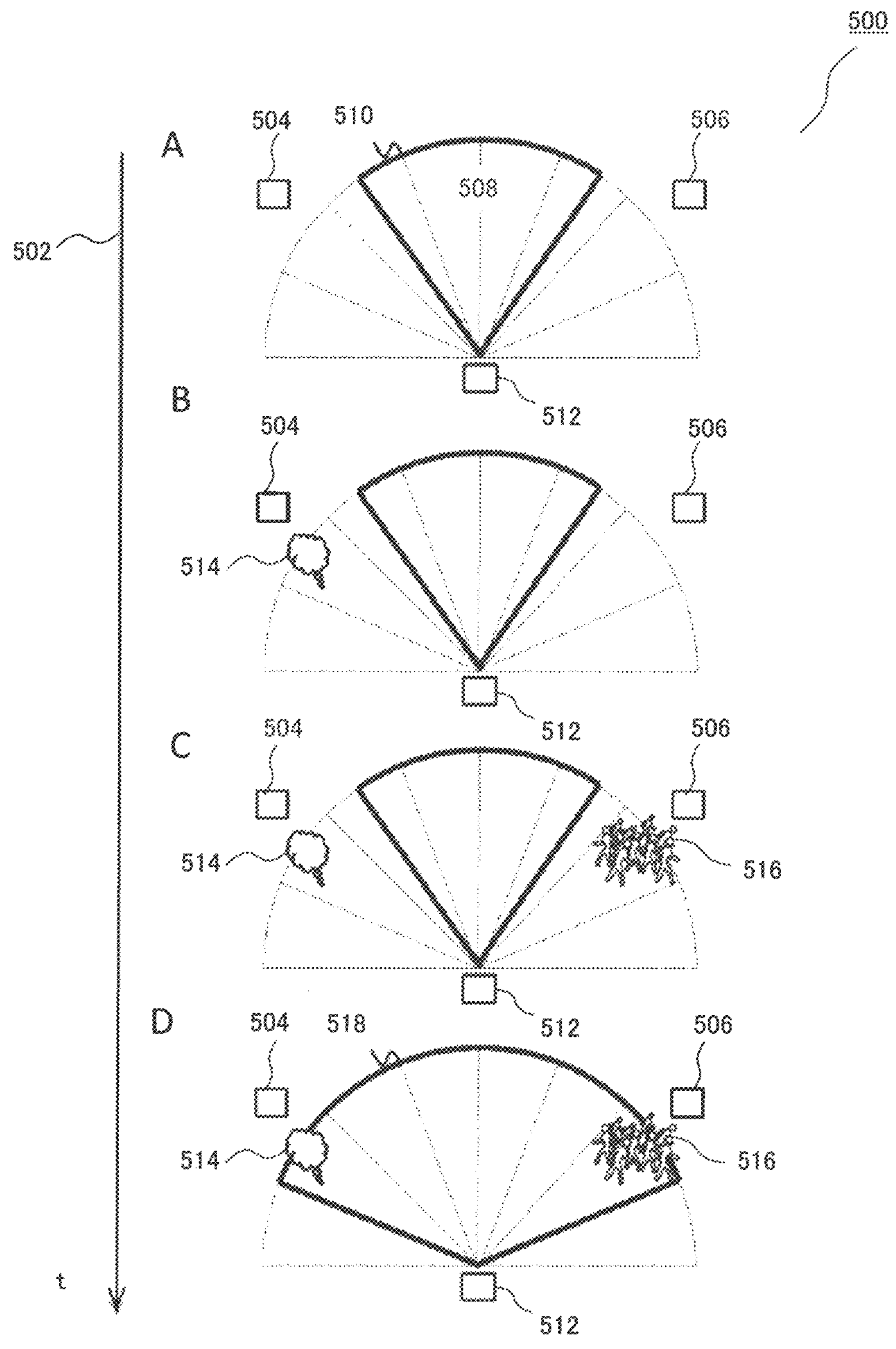
FIG. 5 depicts an example of imaging range adjustment using an odor sensor and infrared sensor (zooming-out) in accordance with the first exemplary embodiment.

FIG. 5 depicts an imaging range adjustment using an odor sensor and infrared sensor (zoom-out) 500. Timeline 502 shows four steps (A to D) for the imaging range adjustment 500. At step A, a Field of View 508 of a camera and microphone array 512 is set at an initial adjustment range 510. The sensor data analysis part 104 may receive sensor data captured by any sensing device, such as an odor sensor 504 and an infrared sensor 506, to detect abnormal events.

At step B, an abnormal odor 514 is detected at the odor sensor 504 within a detected time. At step C, an unusual crowd 516 is detected at the infrared sensor 506. At step D, the event size estimation part 108 estimates the size of the event by calculating both right and left maximum angles for Field of View within the direction of the camera and within a predetermined time width using the sensor's location information. Then, the camera control part 110 controls the surveillance camera by comparing the current setting of the camera with the estimated size of the event consisting of the maximum angles. The camera control part 110 then controls the camera and microphone array 512 to zoom-out to an adjusted imaging range 518.

Figure 6:
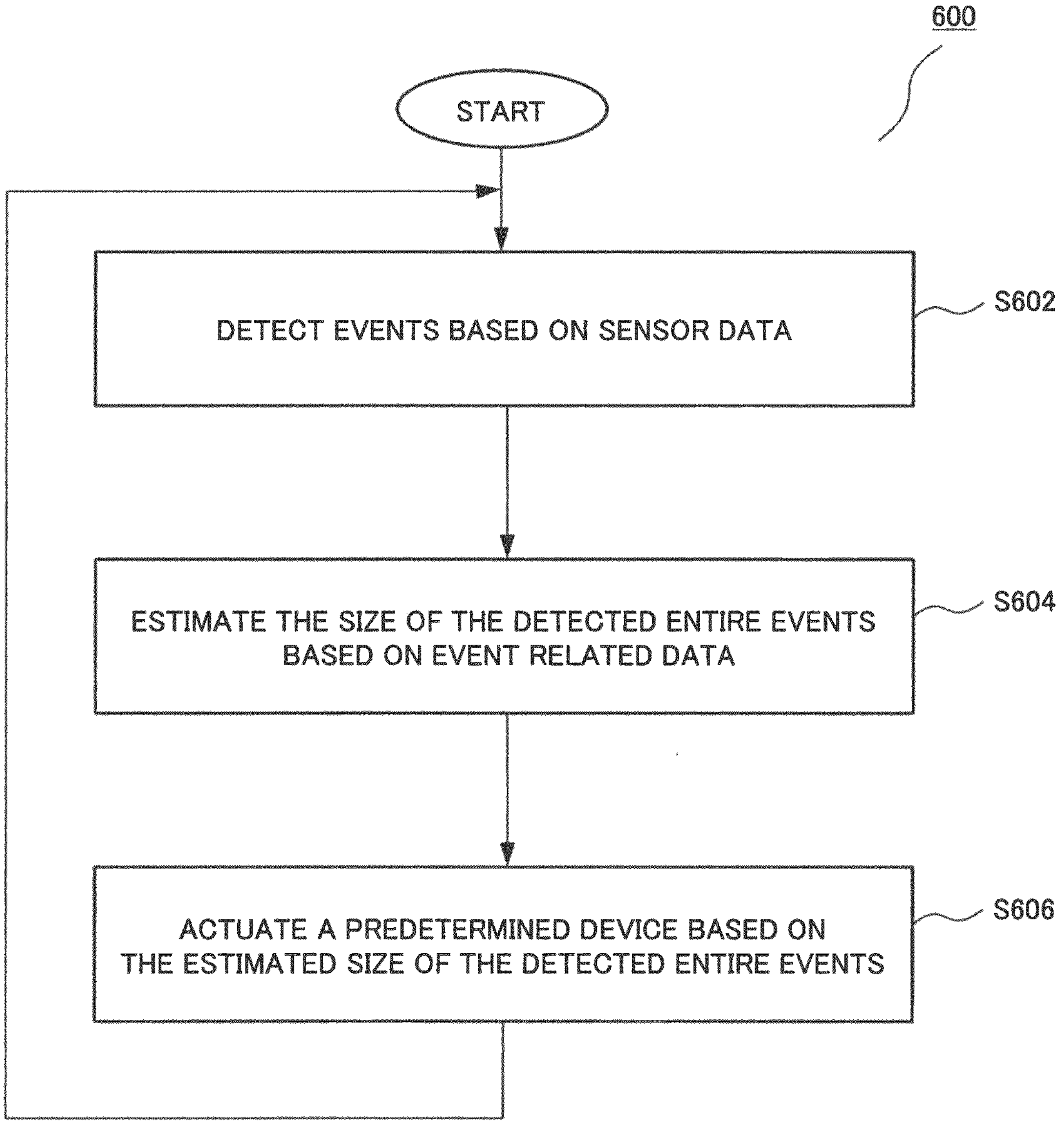
FIG. 6 depicts a flowchart of a method of monitoring event related data in accordance with the first exemplary embodiment.

FIG. 6 depicts a flowchart 600 of a method for monitoring event related data in accordance with a present embodiment. A sensor data analyzer detects events based on sensor data (S602). Based on the event related data of the detected events, the size of the detected entire events is estimated (S604). Then, a predetermined device is actuated based on the estimated size of the detected entire events (S606).

Figure 7:
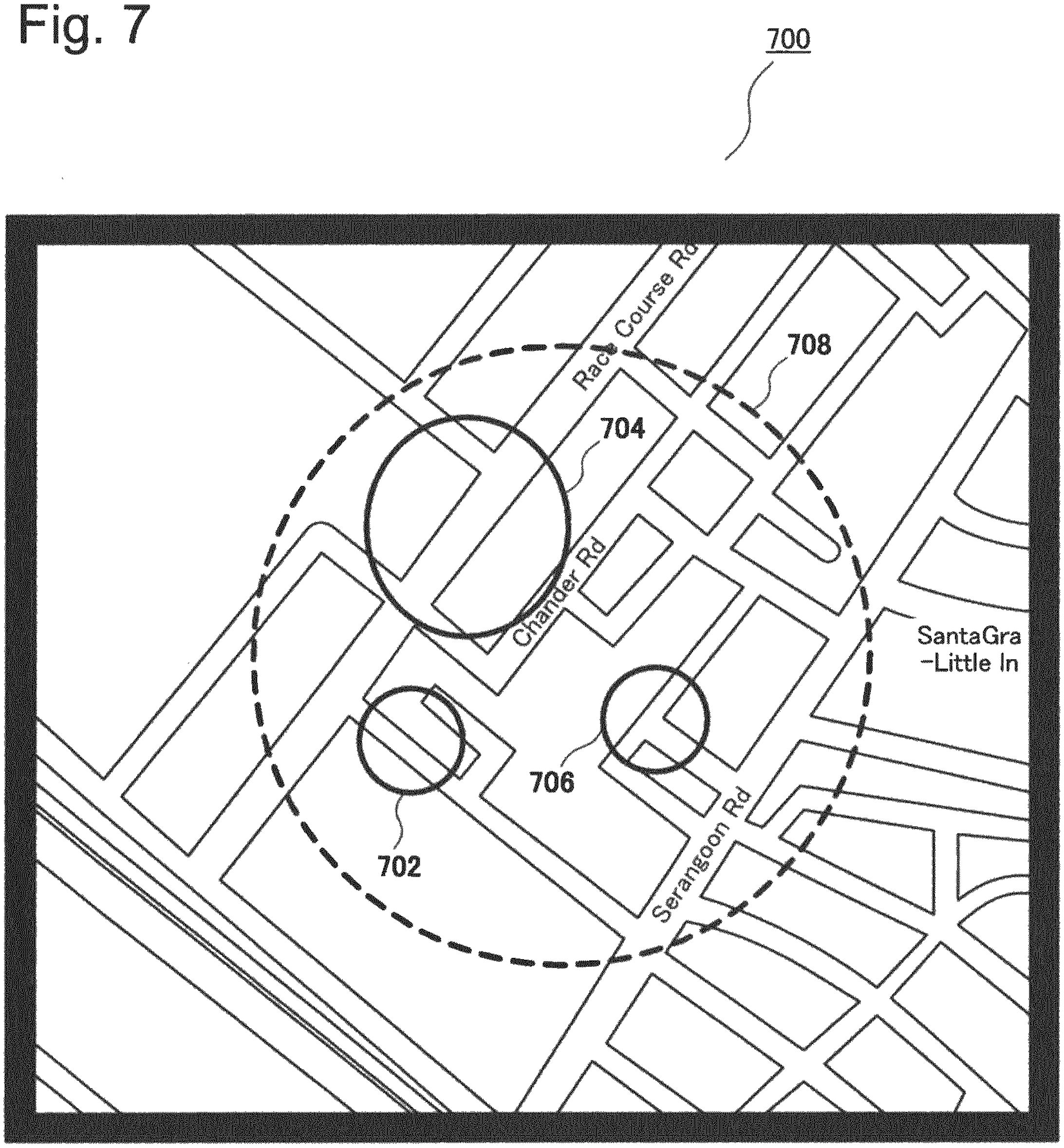
FIG. 7 depicts a display showing the estimated size of the detected entire events on a map in accordance with the first exemplary embodiment.

FIG. 7 depicts a display 700 showing the size of the detected entire events on a map in accordance with a present embodiment. In the present embodiment, sounds of breaking glass 702 are detected by a sensor, such as a microphone. Next, crowds 704 are detected by a sensor, such as an infrared sensor. After that sounds of fighting 706 are detected by a sensor such as a microphone. Based on these event related data, the geographical size of the detected entire events 708 is estimated by the event size estimation part 108. A display 700 may be actuated to show the estimated size of the detected entire events on a map.

FIG. 8 depicts a look-up table 800 for alarm notification system 114 in accordance with a present embodiment. In the present embodiment, an event or a plurality of events are detected by one or more sensors. Based on the event related data from the sensors, the size of the detected entire events is estimated by the event size estimation part. The actuator actuates an alarm notification system 114 so that the alarm notification system 114 selects a notification destination based on the estimated size of the detected entire events. For example, if the estimated size of the detected entire events is 'Small', the alarm notification system 114 refers to a look-up table 800 and selects 'Police' as a notification destination. Then, the alarm notification system 114 sends alarm to 'Police'. Alternatively, if the estimated size of the detected entire events is 'Medium' or 'Large', the alarm notification system 114 selects 'Fire and Ambulance Service Division' or 'Counter-Terrorism Action Group' as a notification destination based on the look-up table 800. Users may customize the notification destination and size of the detected entire events in the look-up table 800.

Second Exemplary Embodiment

Figure 9:
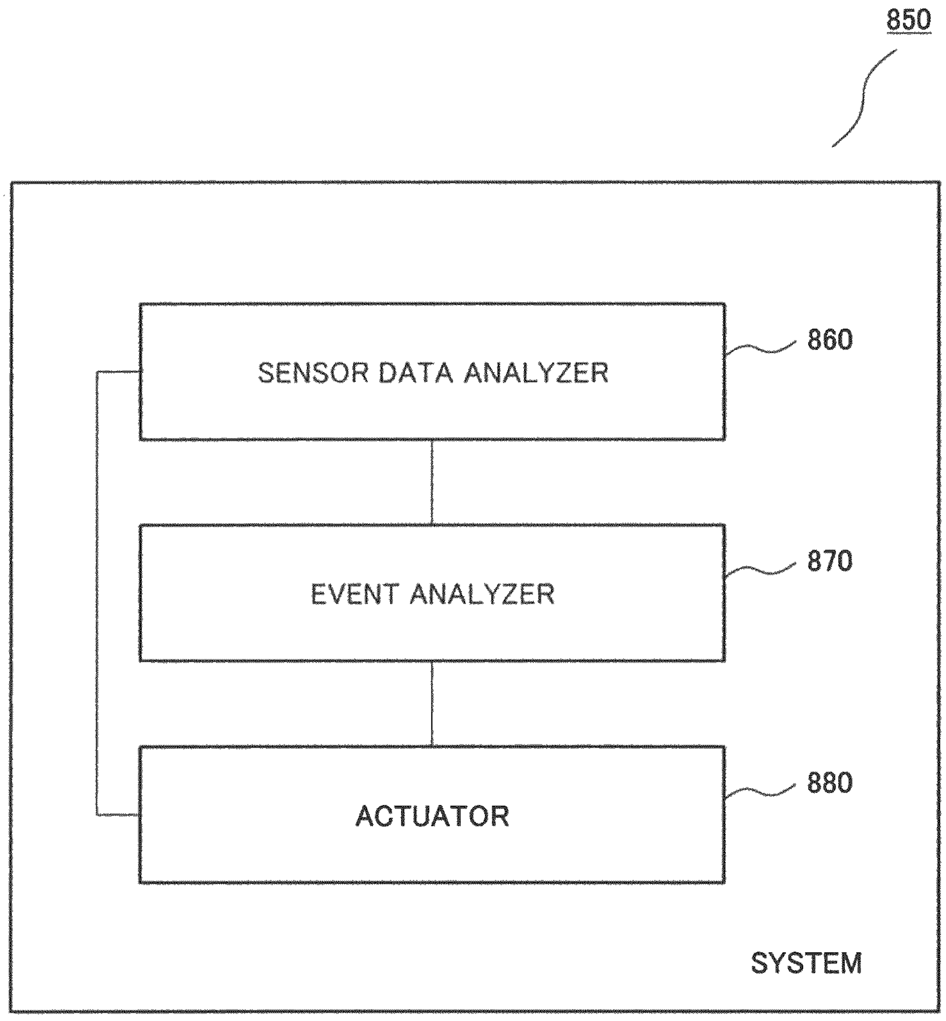
FIG. 9 depicts a block diagram of a system in accordance with a second exemplary embodiment.

FIG. 9 depicts a block diagram of a system 850 in accordance with the second exemplary embodiment. The system 850 includes a sensor data analyzer 860, an event analyzer 870 and an actuator 880. The sensor data analyzer 860 detects events based on sensor data. The event analyzer 870 is coupled to the sensor data analyzer 860 and estimates the size of the detected entire events based on event related data of the detected events from the sensor data analyzer 860. The actuator 880 is coupled to the sensor data analyzer 860 and the event analyzer 870 and actuates a predetermined device based on the estimated size of the detected entire events.

The sensor data analyzer 860 includes the sensor data analysis part 104 of the first exemplary embodiment. The event analyzer 870 and the actuator 880 include the event size estimation part 108 of the first exemplary embodiment.

By the above-described configuration, according to the second exemplary embodiment, the improved system that can capture abnormal events within a surveillance area at a size appropriate to the abnormal event can be provided.

Figure 10:
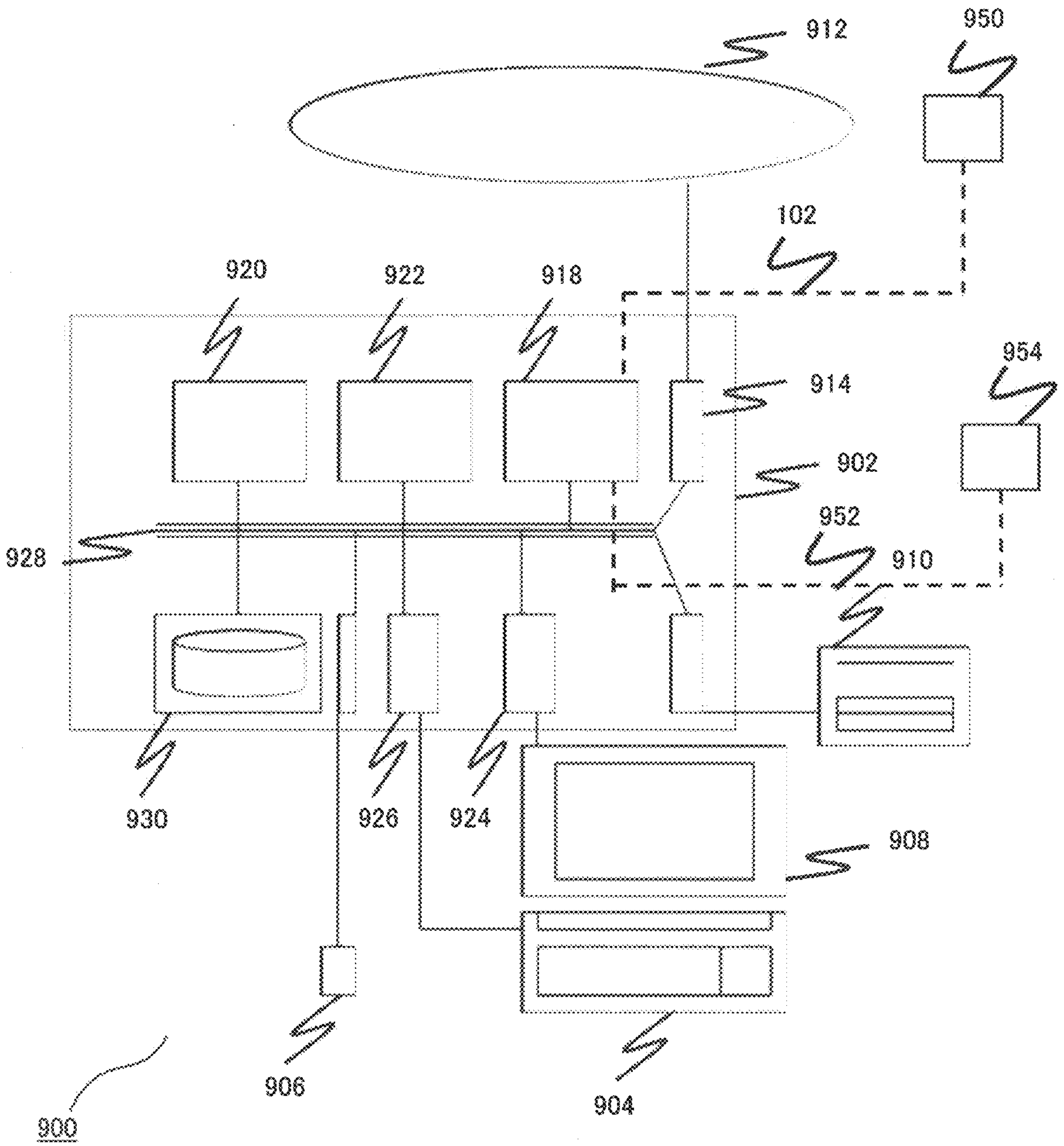
FIG. 10 depicts a computer system for implementing a method of monitoring event related data in accordance with the first and the second exemplary embodiment.

The method and system of the described exemplary embodiments can be implemented on a computer system 900, schematically shown in FIG. 10. It may be implemented as software, such as a computer program being executed within the computer system 900, and instructing the computer system 900 to conduct the method of the example embodiments.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM (Global System for Mobile communications) mobile telephone system. The computer program when loaded and executed on such a general-purpose computer effectively results in an apparatus that implements the steps of the preferred method.

The computer system 900 comprises a computer module 902, input modules such as a keyboard 904 and mouse 906 and a plurality of output devices such as a display 908, and printer 910.

The computer module 902 is connected to a computer network 912 via a suitable transceiver device 914, to enable access to e.g. the Internet or other network systems such as Local Area Network (LAN) or Wide Area Network (WAN).

The computer module 902 in the example includes a processor 918, a Random Access Memory (RAM) 920 and a Read Only Memory (ROM) 922. The computer module 902 also includes a number of Input/Output (I/O) interfaces, for example I/O interface 924 to the display 908, and I/O interface 926 to the keyboard 904.

The components of the computer module 902 typically communicate via an interconnected bus 928 and in a manner known to the person skilled in the relevant art.

The application program is typically supplied to the user of the computer system 900 encoded on a data storage medium such as a CD (Compact-Disc)-ROM or flash memory carrier and read utilising a corresponding data storage medium drive of a data storage device 930. The application program is read and controlled in its execution by the processor 918. Intermediate storage of program data may be accomplished using RAM 920.

The processor 918 may execute a set of instructions that perform the method claimed with respect to FIG. 6. The processor 918 is configured to receive sensor data 102 captured by the sensing devices disclosed with regard to FIG. 1. The sensor data 102 may be received by sensors 950 that are located at e.g. a remote surveillance area. The processor 918 is configured to analyze the sensor data 102 to detect event(s) and event related data. Based on the event related data of the detected event(s), the processor 918 is configured to estimate the size of the detected entire events. The processor 918 sends out actuation data 952 to one or more actuators 954 so that the one or more actuators 954 can actuate one or more predetermined devices such as a camera, a display and an alarm notification system. The one or more predetermined devices are actuated based on the estimated size of the detected entire events.

While exemplary embodiments have been presented in the foregoing detailed description of the invention, it should be appreciated that a vast number of variations exist. For example, those skilled in the art will realize from the teachings herein that the present technology may also be applied to any part in the other type of chemical sensors.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention. It is understood that various changes may be made in the function and arrangement of elements and method of operation described in an exemplary embodiment without departing from the scope of the invention as set forth in the appended claims.

A part or the whole of the foregoing exemplary embodiment and the variations thereof may be defined as a supplementary note cited hereunder. However, the exemplary embodiment and the variations are not limited to the following supplementary note.

Supplementary Note 1

A non-transitory computer readable storage medium storing the program that causes a computer to perform:

- a process that detects events based on sensor data by a sensor data analyzer;
- a process that estimates the size of the detected entire events based on event related data of the detected events; and a process that actuates a predetermined device based on the estimated size of the detected entire events.

This application is based upon and claims the benefit of priority from Singapore patent application Ser. No. 10201501222X filed on Feb. 17, 2015, the entire disclosure of which is incorporated herein.

INDUSTRIAL APPLICABILITY

The present invention can be applied to, for example, video surveillance systems which are used in several areas for routine surveillance.

REFERENCE SINGS LIST

100 Video surveillance system
102 Sensor data
104 Sensor data analysis part
106 Sensing device information database
108 Event size estimation part
110 Camera control part
112 Display
114 Alarm notification system
200 Imaging range adjustment (zoom-out)
202 Timeline
204 Initial imaging range
206 Field of View
208 Camera and microphone array
210 Breaking glass
212 Direction of arrival
214 Shouting
216 Direction of arrival
218 Adjusted imaging range
300 Imaging range adjustment based on sound (zoom-in and controlling the direction of the camera)
302 Timeline
304 Initial adjustment range
306 Field of View
308 Camera and microphone array
310 Fighting
312 Direction of arrival
314 Adjusted imaging range
400 Imaging range adjustment based on the type of sound event (zooming-out)
402 Timeline
404 Initial adjustment range
406 Field of View
408 Camera and microphone array
410 Explosion
412 Direction of arrival
414 Adjusted imaging range
500 Imaging range adjustment using an odor sensor and infrared sensor (zooming-out)
502 Timeline
504 Odor sensor
506 Infrared sensor
508 Field of View
510 Initial adjustment range
512 Camera and microphone array
514 Abnormal odor
516 unusual crowd
518 Adjusted imaging range
600 Flowchart of the method for monitoring event related data
602 Step of detecting events
604 Step of estimating the size of the detected entire event 606 Step of actuating predetermined device based on the estimated size of event
700 Display
702 Breaking glass
704 Crowd
706 Fighting
708 Size of the detected entire events
800 Look-up table
900 Computer system
902 Computer module
904 Keyboard
906 Mouse
908 Display
910 Printer
912 Computer network
914 Suitable transceiver device
918 Processor
920 Random Access Memory (RAM)
922 Read Only Memory (ROM)
924 I/O interface to display
926 I/O interface to keyboard
928 Interconnected bus
930 Data storage device
950 Sensors
952 Actuation data
954 Actuators

The invention claimed is:

1. A video surveillance system comprising:
at least one memory storing instructions;
a surveillance image sensor;
a sensor generating sensor data; and
at least one processor coupled to the at least one memory, the at least one processor configured to execute the instructions to:
detect an event in a predetermined surveillance area based on the sensor data generated by the sensor;
receive a plurality of images corresponding to the detected event captured by the surveillance image sensor;
determine a type of the detected event;
generate an alarm notification, wherein the alarm notification identifies the detected event and the type of the detected event;
transmit the alarm notification to a predetermined destination based on information provided by a user of the video surveillance system, wherein the alarm notification is transmitted to the predetermined destination when the event is determined to have occurred;
obtain information indicating a predetermined manner in which at least one predetermined device is to be actuated, wherein, before detection of the detected event, the video surveillance system is configured to receive customization of the predetermined manner by the user of the video surveillance system, wherein the customization defines an association between the type of the detected event and the predetermined manner in which the at least one predetermined device is to be actuated; and
control to actuate at least one predetermined device in the predetermined manner based on the detected event,
wherein the customization configures a first device to actuate in response to detection of a first detected event, and a second device to actuate in response to detection of a second detected event,
wherein the type of the event is based on a scale of the event, and
wherein the video surveillance system is configured to receive customization related to the scale of the event from the user, and set the scale of the event based on the customization.

2. The video surveillance system according to claim 1, wherein the at least one processor is configured to execute the instructions to:
determine a location of the detected event.

3. The video surveillance system according to claim 1, wherein the sensor data is based on sound detected by a microphone and the type of the detected event is determined based on the sound.

4. The video surveillance system according to claim 3, wherein the type of the detected event is determined to be breaking of glass and the breaking of the glass is detected based on the sound.

5. A video surveillance method comprising:
detecting an event in a predetermined surveillance area based on sensor data generated by a sensor;
receiving a plurality of images corresponding to the detected event captured by a surveillance image sensor;
determining a type of the detected event;
generating an alarm notification, wherein the alarm notification identifies the detected event and the type of the detected event;
transmitting the alarm notification to a predetermined destination based on information provided by a user of a video surveillance system, wherein the alarm notification is transmitted to the predetermined destination when the event is determined to have occurred;
obtaining information indicating a predetermined manner in which at least one predetermined device is to be actuated, wherein, before detection of the detected event, the video surveillance system is configured to receive customization of the predetermined manner by the user of the video surveillance system, wherein the customization defines an association between the type of the detected event and the predetermined manner in which the at least one predetermined device is to be actuated; and
controlling to actuate the at least one predetermined device in the predetermined manner based on the detected event,
wherein the customization configures a first device to actuate in response to detection of a first detected event, and a second device to actuate in response to detection of a second detected event,
wherein the type of the event is based on a scale of the event, and
wherein the video surveillance system is configured to receive customization related to the scale of the event from the user, and set the scale of the event based on the customization.

6. The video surveillance method according to claim 5, further comprising:
determining a detection time of the detected event.

7. The video surveillance method according to claim 5, further comprising:
determining a location of the detected event.

8. The video surveillance method according to claim 5, wherein the sensor data is based on sound detected by a microphone and the type of the detected event is determined based on the sound.

9. The video surveillance method according to claim 8, wherein the type of the detected event is determined to be breaking of glass and the breaking of the glass is detected based on the sound.

10. A security control system comprising:

at least one memory storing instructions; and at least one processor coupled to the at least one memory, the at least one processor configured to execute the instructions to:

detect that a predetermined event customized by a user of the security control system occurred in a surveillance area by using sensor data;

identify a type of the predetermined detected event;

obtain information indicating a predetermined manner in which at least one predetermined device is to be actuated, wherein, before the detected event is detected, the security control system is configured to receive customization of the predetermined manner by the user of the security control system, wherein the customization defines an association between the type of the detected event and the predetermined manner in which the at least one predetermined device is to be actuated;

actuate the at least one predetermined device in the predetermined manner based on the identified type of the predetermined detected event in the surveillance area; and send an alarm to a destination when the event is determined to have occurred based on association of the identified type of the predetermined detected event and alarm settings, wherein the security control system is further configured to receive customization of the alarm settings by the user of the security control system, wherein the customization of the alarm is configured to set a time period related to the occurrence of the event based on an event type, wherein the customization configures a first device to actuate in response to detection of a first detected event, and a second device to actuate in response to detection of a second detected event, wherein the type of the event is based on a scale of the event, and wherein the video surveillance system is configured to receive customization related to the scale of the event from the user, and set the scale of the event based on the customization.

11. The security control system according to claim 10, wherein the at least one processor is configured to execute the instructions to:

monitor for the predetermined events in the surveillance area set by the user.

12. The security control system according to claim 10, wherein the at least one processor is configured to execute the instructions to:

determine a detection time of the predetermined detected event.

13. The security control system according to claim 10, wherein the at least one processor is configured to execute the instructions to:

determine a location of the predetermined detected event.

14. The security control system according to claim 10, wherein the sensor data is based on sound detected by a microphone and the type of the predetermined detected event is determined based on the sound.

15. The security control system according to claim 14, wherein the type of the predetermined detected event is determined to be breaking of glass and the breaking of the glass is detected based on the sound.

16. The security control system according to claim 10, wherein the at least one processor is configured to execute the instructions to:

send a notification message to the user as security alert as a response to the predetermined detected event in the surveillance area.

17. The security control system according to claim 10, wherein the at least one processor is configured to execute the instructions to:

modify a field of view of a surveillance camera.

18. The security control system according to claim 10, wherein the predetermined device comprises at least one of a surveillance camera, a display device, a light switch controller, and an audio device.

19. The security control system according to claim 10, wherein the type of the predetermined detected event is determined to be fire or theft based on the sensor data.

20. A security control method comprising:

detecting that a predetermined event customized by a user of a security control system occurred in a surveillance area by using sensor data;

identifying a type of the predetermined detected event;

obtaining information indicating a predetermined manner in which at least one predetermined device is to be actuated, wherein the security control system is configured to receive before the detected event is detected, customization of the predetermined manner by the user of the security control system, wherein the customization defines an association between the type of the detected event and the predetermined manner in which the at least one predetermined device is to be actuated;

actuating the at least one predetermined device in the predetermined manner customized by the user based on the identified type of the predetermined detected event in the surveillance area; and sending an alarm to a destination when the event is determined to have occurred based on association of the identified type of the predetermined detected event and alarm settings, wherein the security control system is further configured to receive customization of the alarm settings by the user of the security control system wherein the customization of the alarm is configured to set a time period related to the occurrence of the event based on an event type, wherein the customization configures a first device to actuate in response to detection of a first detected event, and a second device to actuate in response to detection of a second detected event, wherein the type of the event is based on a scale of the event, and wherein the video surveillance system is configured to receive customization related to the scale of the event from the user, and set the scale of the event based on the customization.

21. The security control method according to claim 20, further comprising:

monitoring for the predetermined events in the surveillance area set by the user.

22. The security control method according to claim 20, further comprising:

determining a detection time of the predetermined detected event.

23. The security control method according to claim 20, further comprising:

determining a location of the predetermined detected event.

24. The security control method according to claim 20, wherein the sensor data is based on sound detected by a microphone and the type of the predetermined detected event is determined based on the sound.

25. The security control method according to claim 24, wherein the type of the predetermined detected event is determined to be breaking of glass and the breaking of the glass is detected based on the sound.

26. The security control method according to claim 20, further comprising:

sending a notification message to the user as security alert as a response to the predetermined detected event in the surveillance area.

27. The security control method according to claim 20, further comprising:

modifying a field of view of a surveillance camera.

28. The security control method according to claim 20, wherein the predetermined device comprises at least one of a surveillance camera, a display device, a light switch controller, and an audio device.

29. The security control method according to claim 20, wherein the type of the predetermined detected event is determined to be fire or theft based on the sensor data.

30. The security control system according to claim 10, wherein the alarm settings are defined by type of the predetermined detected event.

* * * * *